Patented July 14, 1942

2,290,133

UNITED STATES PATENT OFFICE 2,290,133

ESTER GUM COATING COMPOSITION

Robert C. Swain, Riverside, and Pierrepont Adams, Stamford, Conn., assignors to American Cyanamid Company, New York, N. Y., a corporation of Maine No Drawing. Application November 8, 1940, Serial No. 364,847

4 Claims. (Cl. 260—24)

This invention relates to coating compositions containing ester gum and melamine-formaldehyde resins.

An object of this invention is to improve the physical and chemical properties of coating compositions containing ester gum, e. g., alkali resistance, water resistance, light resistance, etc.

Another object of this invention is to provide compositions containing ester gum and compatible proportions of compatible melamine-formaldehyde resins.

These and other objects are attained by blending ester gum with at least 60% (total solids weight basis) of a melamine-formaldehyde resin which has been alkylated with an alcohol containing at least 2 carbon atoms and wherein the molal ratio of formaldehyde to melamine is at least about 4:1.

The following examples in which the proportions are in parts by weight are given by way of illustration and not in limitation.

Example 1

| | Parts |
|---|---|
| Melamine-formaldehyde resin "A" | 75 |
| Ester gum | 25 |

A composition containing these ingredients is prepared by admixing 150 parts of melamine-formaldehyde resin "A" solution (50% resin) with 50 parts of "ester gum stock solution" (containing 50% of ester gum and 50% of xylene). Films of the composition are applied to metal objects and baked at a temperature of about 135° C. for about one-half hour. The product is a hard, transparent coating having good film strength.

Example 2

| | Parts |
|---|---|
| Melamine-formaldehyde resin "B" | 90 |
| Ester gum | 10 |

A composition containing these ingredients is prepared by admixing 180 parts of melamine-formaldehyde resin "B" solution (50% resin) with 20 parts of "ester gum stock solution." Films of the composition are applied to metal objects and baked at a temperature of about 135° C. for about one-half hour. A clear, tough film is formed.

Example 3

| | Parts |
|---|---|
| Melamine-formaldehyde resin "C" | 90 |
| Ester gum | 10 |

A composition containing these ingredients is prepared by admixing 180 parts of melamine-formaldehyde resin "C" solution (50% resin) with 20 parts of "ester gum stock solution." Films of the composition are applied to metal objects and baked at a temperature of about 135° C. for about one-half hour. The product formed is a very hard, clear coating.

Example 4

| | Parts |
|---|---|
| Melamine-formaldehyde resin "D" | 90 |
| Ester gum | 10 |

A composition containing these ingredients is prepared by admixing 180 parts of melamine-formaldehyde resin "D" solution (50% resin) with 20 parts of "ester gum stock solution." Films of the composition are applied to metal objects and baked at a temperature of about 135° C. for about one-half hour. A light-colored film having good chemical properties is formed.

Example 5

| | Parts |
|---|---|
| Melamine-formaldehyde resin "E" | 75 |
| Ester gum | 25 |

A composition containing these ingredients is prepared by admixing 150 parts of melamine-formaldehyde resin "E" solution (50% resin) with 50 parts of "ester gum stock solution." Films of the composition are applied to metal objects and baked at a temperature of about 135° C. for about one-half hour. A hard, transparent film is produced.

Preparation of melamine-formaldehyde resin "A"

| | Parts |
|---|---|
| Melamine (1 mol) | 126 |
| Formalin (5 mols) (37% formaldehyde in water) | 405.5 |
| Ethanol | 440 |

This mixture is refluxed at a temperature of about 75–80° C. at atmospheric pressure for 6–12 hours. Substantially all of the water is removed by distillation with additional ethanol. When substantially all of the water has been removed, the resin solution is concentrated to about 50% solids by vacuum distillation.

Preparation of melamine-formaldehyde resin "B"

| | Parts |
|---|---|
| Melamine (1 mol) | 126 |
| Formalin (4 mols) (37% formaldehyde in water) | 324.4 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

*Preparation of melamine-formaldehyde resin "C"*

| | Parts |
|---|---|
| Melamine | 283 |
| Formalin (37% formaldehyde in water) | 978 |

This mixture is heated at about 70–80° C. until a homogeneous solution is obtained. The pH is adjusted to about 7.3 with caustic soda and vacuum concentrated to remove about 50–60% of the free water. Sufficient phosphoric acid is added to neutralize the caustic soda present and then 320 parts of methanol are added. Wet methanol is gradually distilled off from the mixture and dry methanol is added at about the same rate as wet methanol is distilled off. This distillation and addition of methanol is continued until the distillate is substantially dry methanol. During this operation which requires about 4 hours, about 1600 parts of methanol are added. 707 parts of "Pentasol" (trade name of Sharples Solvents Corporation for mixed amyl alcohols) are added and the distillation is continued until the vapor temperature rises to about 100–105° C. About 710 parts of the distillate are collected. The pressure is lowered sufficiently to reduce the temperature to 80–90° C. and 178 parts more of the distillate are collected, leaving as a product a resin solution containing 50% of resin solids in "Pentasol."

*Preparation of melamine-formaldehyde resin "D"*

| | Parts |
|---|---|
| Melamine (1 mol) | 126 |
| Formalin (5 mols) (37% formaldehyde in water) | 405.5 |
| n-Hexyl alcohol | 500 |
| Methyl alcohol | 200 |

This mixture is placed in a reflux apparatus which is provided with a condenser and a suitable water trap through which the reflux condensate passes on its return to the reaction chamber and in which the essentially aqueous fraction of the condensate may be separated from the essential non-aqueous fraction and means is provided so that the former fraction may be drawn off if desirable. The reaction mixture is refluxed at a temperature of about 80–85° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. This solution is essentially a hexylated resin in hexyl alcohol, all or nearly all of the methanol having been eliminated from it during the distillation. The resulting resin solution may be diluted to about 50% solids with any desired solvent or diluent, e. g., xylene.

*Preparation of melamine-formaldehyde resin "E"*

| | Parts |
|---|---|
| Melamine (1 mol) | 126 |
| Formalin (5 mols) (37% formaldehyde in water) | 405.5 |
| Benzyl alcohol | 600 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 93–95° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

Alkylated melamine-formaldehyde resins may be produced in accordance with the procedures outlined above, as well as in any other suitable manner. Aqueous syrups of melamine-formaldehyde resins may be first produced and then alkylated either simultaneously with dehydration or subsequent to dehydration. Generally the simultaneous condensation of melamine, formaldehyde and a suitable alcohol is used because of convenience. In order to facilitate the alkylation with the higher alcohols, e. g., the amyl alcohols, hexyl alcohols and the octanols, a low boiling alcohol such as methanol or butanol may be mixed with the higher alcohol, thereby assisting in removing the water and causing the reaction to take place readily at somewhat lower temperatures than would otherwise be required. The low boiling alcohol is removed by distillation after the reaction is completed. Another method for producing resins alkylated with higher alcohols is to alkylate the melamine-formaldehyde resin with a low boiling alcohol such as methanol and subsequently replacing it with the desired higher alcohol, distilling out the low boiling alcohol. The condensation may be carried out either with or without an acid catalyst and in some instances basic catalysts may desirably be utilized.

The melamine-formaldehyde resins vary slightly according to minor variations in control during their production and in some instances small proportions of a suitable solvent material, e. g., toluene, xylene, benzene, ethyl acetate, acetone, the monoethyl ether of ethylene glycol ("Cellosolve"), etc., may be added to the original solutions of ester gum and melamine-formaldehyde resin in order to produce perfectly clear solutions if such solutions are not originally obtained.

While formaldehyde has been used in the previous examples, it will be obvious that the various polymers of formaldehyde, e. g., paraformaldehyde, or substances which yield formaldehyde may be used in place of part or all of the formaldehyde.

As indicated by the above examples ester gum has been found to be compatible with at least 60% (total solids weight basis) of melamine-formaldehyde resins wherein the molal ratio of formaldehyde to melamine is at least about 4:1. While higher ratios of formaldehyde to melamine than 6:1 may be used, it is generally undesirable inasmuch as formaldehyde is lost during the curing so that usually the product in its cured condition does not contain more than about 6 mols of formaldehyde to 1 mol of melamine.

The resins may be alkylated with any of the straight chain or branched chain alcohols containing at least 2 carbon atoms, as well as with aralkyl types of alcohols such as benzyl alcohol. Preferably alcohols containing from 2 to 8 carbon atoms are employed. The term "alkylated melamine-formaldehyde resin" is intended to denote compositions which are reacted with an alcohol.

Our products may be plasticized with a wide variety of materials such as the alkyl phthalates, tricresyl phosphate, various alkyd resins, particularly the fatty oil acid modified alkyd resins, etc.

Various fillers, pigments, dyes and lakes may be added to our compositions, e. g., lithopone, zinc oxide, titanium oxide, ferric oxide, Prussian blue, toluidine red, malachite green, mica, glass fibers, ground glass, powdered silica, etc.

Curing catalysts may be incorporated in the compositions to effect a more rapid curing of the melamine-formaldehyde resins or to enable the resin to be cured at lower temperatures than indicated in the above examples. Such substances are, for instance, phosphoric acid, ammonium salts of phosphoric acid, etc.

Other resinous compositions may be included in various coating compositions, e. g., urea-formaldehyde resins, phenol-formaldehyde resins, alkyd resins, ethyl cellulose, cellulose acetate, nitrocellulose, etc., as well as in varnishes, especially tung oil varnishes.

Our mixed products show improved alkali resistance, light resistance, solvent resistance, etc., as compared to ester gum compositions not containing melamine-formaldehyde resins.

Our compositions are useful in the manufacture of paints, lacquers, varnishes and the like, particularly in applications which demand a surface having good resistance to abrasion. Our mixtures have good electrical properties which render them suitable for use in electrical insulation. Products made according to our invention are also useful in the production of printing inks, e. g., since they improve the gloss and drying speed of such inks. Our resin mixtures are especially useful in paper coatings when combined with rubber. Our resin mixtures have many applications when combined with fatty oil acid modified polyhydric alcohol-polycarboxylic acid resins.

The term "compatible" as used herein is intended to denote compositions, films of which are clear and homogeneous after baking.

Obviously many modifications and variations in the processes and compositions described above may be made without departing from the spirit and scope of the invention as defined in the appended claims.

We claim:

1. A coating composition containing a substantial proportion of ester gum and a melamine-formaldehyde resin which has been alkylated with an alcohol containing at least 2 carbon atoms, wherein the molal ratio of formaldehyde to melamine is at least about 4:1 and wherein the weight ratio of melamine-formaldehyde resin to ester gum is at least 3:2.

2. A coating composition containing a substantial proportion of ester gum and a melamine-formaldehyde resin which has been alkylated with n-butanol, wherein the molal ratio of formaldehyde to melamine is at least about 4:1 and wherein the weight ratio of melamine-formaldehyde resin to ester gum is at least 3:2.

3. A coating composition containing a substantial proportion of ester gum and a melamine-formaldehyde resin which has been alkylated with n-hexanol, wherein the molal ratio of formaldehyde to melamine is at least about 4:1 and wherein the weight ratio of melamine-formaldehyde resin to ester gum is at least 3:2.

4. A coating composition containing a substantial proportion of ester gum and a melamine-formaldehyde resin which has been alkylated with benzyl alcohol, wherein the molal ratio of formaldehyde to melamine is at least about 4:1 and wherein the weight ratio of melamine-formaldehyde resin to ester gum is at least 3:2.

ROBERT C. SWAIN.
PIERREPONT ADAMS.